Jan. 26, 1932.  H. L. M. J. BENARD  1,842,855
EPISCOPIC PROJECTING APPARATUS
Filed June 4, 1929  2 Sheets-Sheet 1

Inventor
Henri L.M.J. Benard
by Wilkinson & Giusta
Attorneys

Patented Jan. 26, 1932

1,842,855

UNITED STATES PATENT OFFICE

HENRI LUGLIEN MARIE JOSEPH BÉNARD, OF PARIS, FRANCE, ASSIGNOR TO ANCIENS ETABLISSEMENTS BARBIER, BENARD & TURENNE, SOCIETE ANONYME, OF PARIS, FRANCE, A JOINT-STOCK COMPANY OF FRANCE

EPISCOPIC PROJECTING APPARATUS

Application filed June 4, 1929, Serial No. 368,299, and in France July 31, 1928.

The invention is concerned with an apparatus for projecting the image of a surgical operation on to a screen located in a room adjoining the operating theatre so as to enable a large number of persons to follow the details of the operation.

Said apparatus is characterized by the combination of a lighting apparatus, preferably shadowless, illuminating the operating field and an episcopic device projecting the image of the operation in progress on to a screen of ground glass or on to a white cloth.

The lighting apparatus is hooked on to a movable suspension with or without a counter-weight so as to give it a variable inclination.

The heat radiations of the luminous source of said lighting apparatus are cut off by means of a particular device.

The episcopic system is broadly constituted by an objective located above the operating table, two reflecting surfaces reflecting the luminous rays in order to right the image, on to a second objective located perpendicularly to the preceding one so as to project the image on to a screen or ground glass arranged vertically.

Other advantages and peculiarities of the invention will be gathered from the description thereof about to be given with reference to the accompanying drawings which illustrate diagrammatically and by way of example an embodiment of the invention.

The shadowless lighting apparatus is constituted in the present instance given by way of example, by a single luminous source 1 placed at the focus of an annular Fresnel lens 2 which condenses the luminous rays and directs them parallelly, after refraction, on to a plurality of trapezoidal mirrors 3 located concentrically to the source 1. These mirrors are suitably inclined so as to reflect the light in beams which intersect in X, Y. At this juncture should be located the operating field so as to obtain shadowless illumination. Since the head or hands of the operator only obstruct the luminous rays proceeding from a few mirrors, the field to be illuminated is still lit up by the other mirrors constituting so many separate unit sources.

Said apparatus may be hooked on to a movable suspension with a counter-weight or other type of system in order both to adjust it in height in order to cause the point of intersection X, Y of the reflected luminous beams to coincide with the operating field, and to incline it to the necessary extent for certain surgical proceedings.

Figure 1:
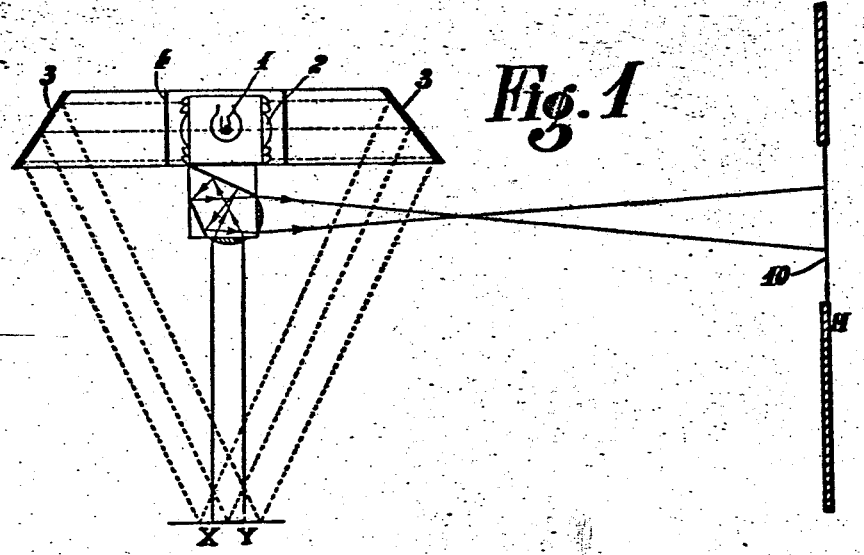
Fig. 1 is a longitudinal sectional elevation of an apparatus according to the invention.
Figure 2:
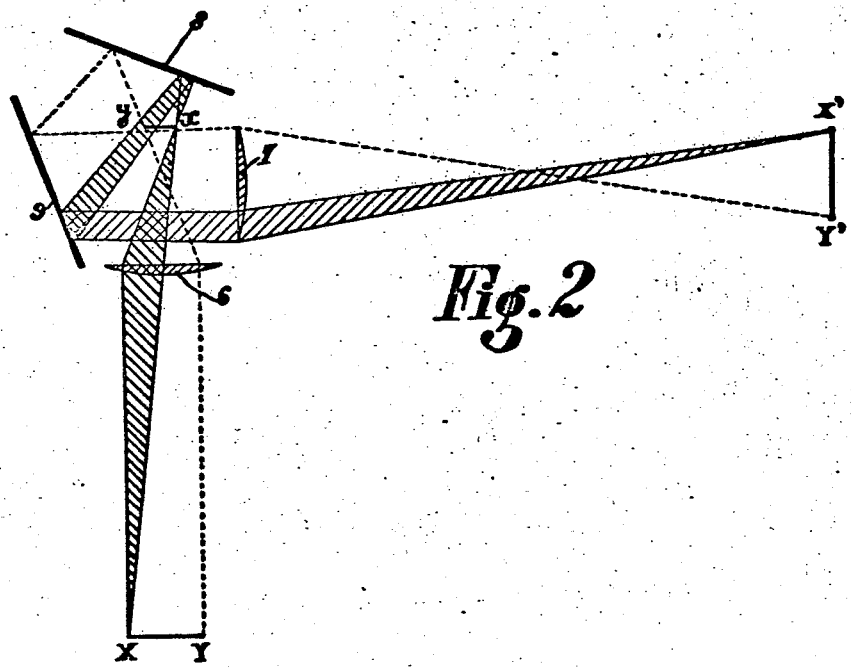
Fig. 2 is a similar enlarged view illustrating the episcopic apparatus in detail.
Figure 3:
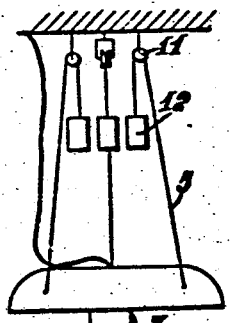
Figs. 3 and 4 are elevations illustrating two alternative forms of the suspension device.

Said suspension may be constituted, as in the case of Fig. 3, by three cables 5 passing over pulleys 11, and at the end of which are suspended counter-weights 12 so designed that the three counter-weights 12 shall balance the complete apparatus. The apparatus may then be inclined by hand, in any desired position, preserving its equilibrium the while.

Figure 4:
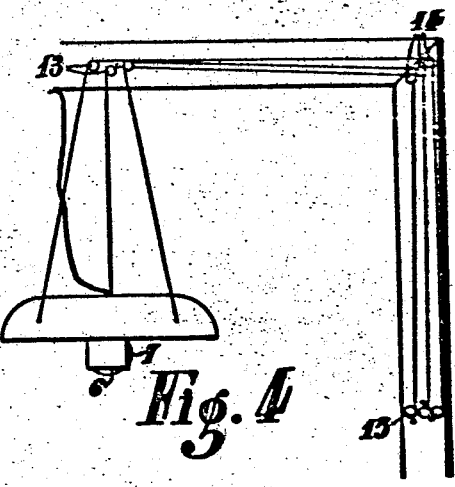

When the apparatus is in such a position that it cannot readily be reached by hand, the device of Fig. 4 may be utilized. In this instance, each of the cables, passes over two guide pulleys 13 and 14 and is then wound on a drum 15 fixed to the wall and rotated by hand by means of a crank. The apparatus is inclined by manœuvring one or more drums.

In order to obtain a sufficiently distinct image on the screen, it is obvious that the operating field must be strongly illuminated; hence the luminous source 1 must be very powerful. Were no device provided for eliminating the rise in temperature at the illuminated spot, the heat would inconvenience the surgeon after a few minutes. To this end, a device must be used which will let through the luminous rays and stop out the heat rays.

In the apparatus forming the object of the invention, this result may be obtained in two different ways.

1. Through the agency of a coloured glass based on iron oxide and which has the property of absorbing the heat rays. This glass may be used in one of the following ways:

(a) In the form of a cylinder 4 surrounding the lens 2.
(b) By making the lens 2 of said glass.
(c) By making the trapezoidal mirrors 3 of said glass.

2. Through the medium of a water circulation which would be produced:

(a) In a circular double-walled glass sleeve surrounding the lamp, the water circulating in the annular space.
(b) In a tank in which the lamp would bathe.
(c) In the double wall of a lamp specially constituted to this effect.

Depending upon the result aimed at, one of said solutions may be used alone or several combined together. It should however be observed that the coloured glass has the advantage of providing illumination similar to daylight whereby the natural colours of the parts of the body are preserved.

The episcopic system is essentially constituted by two lenses 6 and 7 located at right angles, and two reflecting surfaces 8 and 9 the purpose of which is to right the image completely. These surfaces are preferably likewise inclined to the bisector of the angle formed by the two objectives.

Said apparatus operates as follows:

A pencil of luminous rays proceeding from X, after passing through the objective 6, will provide an image of X at $x$. Said luminous pencil is then reflected on to the reflecting surfaces 8 and 9 and after passing through the objective 7 produces the image of $x$ at X'. The like applies for all the beams so that the image of X, Y is produced at $x$, $y$ and the image of $x$, $y$ at X', Y'. The apparatus is focussed so that X', Y' is thrown on to the screen 10.

Said screen 10 is placed on a wall common to the room of the audience and the operating theatre, so that the students or auditors in the room 11 perceive the image of the object on the screen 10 which is transparent. With the optical episcopic system which has just been described, the image is completely righted. Supposing X to be for example the nose of the patient and Y his mouth, the auditors will see the object on the screen in its natural position without it being inverted, as is the case with episcopic devices in current use. This likewise applies in a plane perpendicular to that of X, Y and containing the patient's right and left side.

The reflecting surfaces 8 and 9 may be constituted in any known manner, by flat, silvered mirrors, or else by totally reflecting prisms, in all cases the image will be completely righted.

Figure 5:
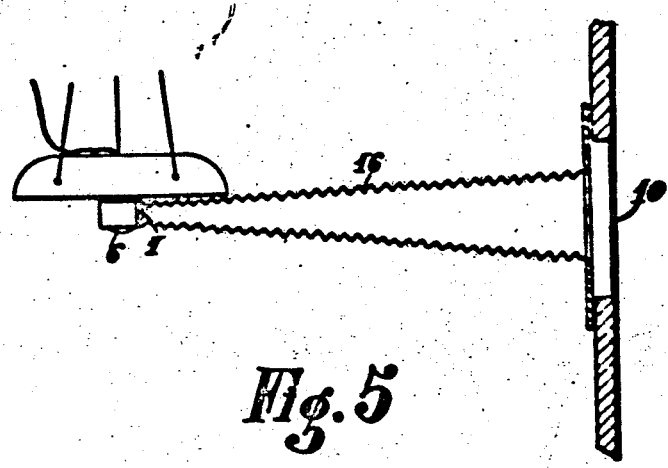
Fig. 5 is a view in part section illustrating the use of a bellows for projection.

In order to obtain a sufficiently sharp image on the screen 10, there is provided a bellows of the type commonly used in photographic cameras and as illustrated at 16 in Fig. 5. Said bellows 16 prevents parasitic rays from falling on the screen. In addition, to increase the sharpness of image, an iris diaphragm may be inserted in the path of the luminous rays before they pass through the objective.

I claim:

1. In a device of the class described, the combination of a luminous source, an annular Fresnel condensing lens disposed about said source, a system of reflecting mirrors disposed about said Fresnel lens and adapted to throw a hollow conical beam of light to supply shadowless illumination on an operating table, an episcopic projecting device located within said hollow cone of light and including an objective located above the operating table for projecting an image of the operating table visible from outside the operating theater.

2. In a device of the class described, the combination of a luminous source, an annular Fresnel condensing lens disposed about said source, a system of reflecting mirrors disposed about said Fresnel lens and adapted to throw a hollow conical beam of light to supply shadowless illumination on an operating table, an episcopic projecting device located within said hollow cone of light and comprising a pair of objectives located above the operating table normally to each other and a pair of reflecting mirrors associated with said objectives, said episcopic means being adapted to project an image of the operating table visible from outside the operating theater.

3. In a device of the class described, the combination of a single luminous source, optical condensing means adapted to condense light rays emitted by said source, a system of tinted trapezoidal reflecting mirrors located in spaced relation to said optical condensing means for reflecting the light rays as a hollow conical beam on to an operating table to produce shadowless illumination thereon, a tinted glass cylinder located between said optical condensing means and said system of reflecting mirrors and surrounding said optical condensing means, and an episcopic projector located within said hollow conical beam and including an objective located above the operating table for projecting an image of the operating table visible from outside the operating theater.

HENRI LUCIEN MARIE JOSEPH BÉNARD.